Jan. 1, 1924 1,479,205
J. W. PARKER
UNIVERSAL GRINDING, DRILLING, AND TURNING MACHINE
Filed June 6, 1921 3 Sheets-Sheet 1

INVENTOR.
John W. Parker
By
ATTORNEY

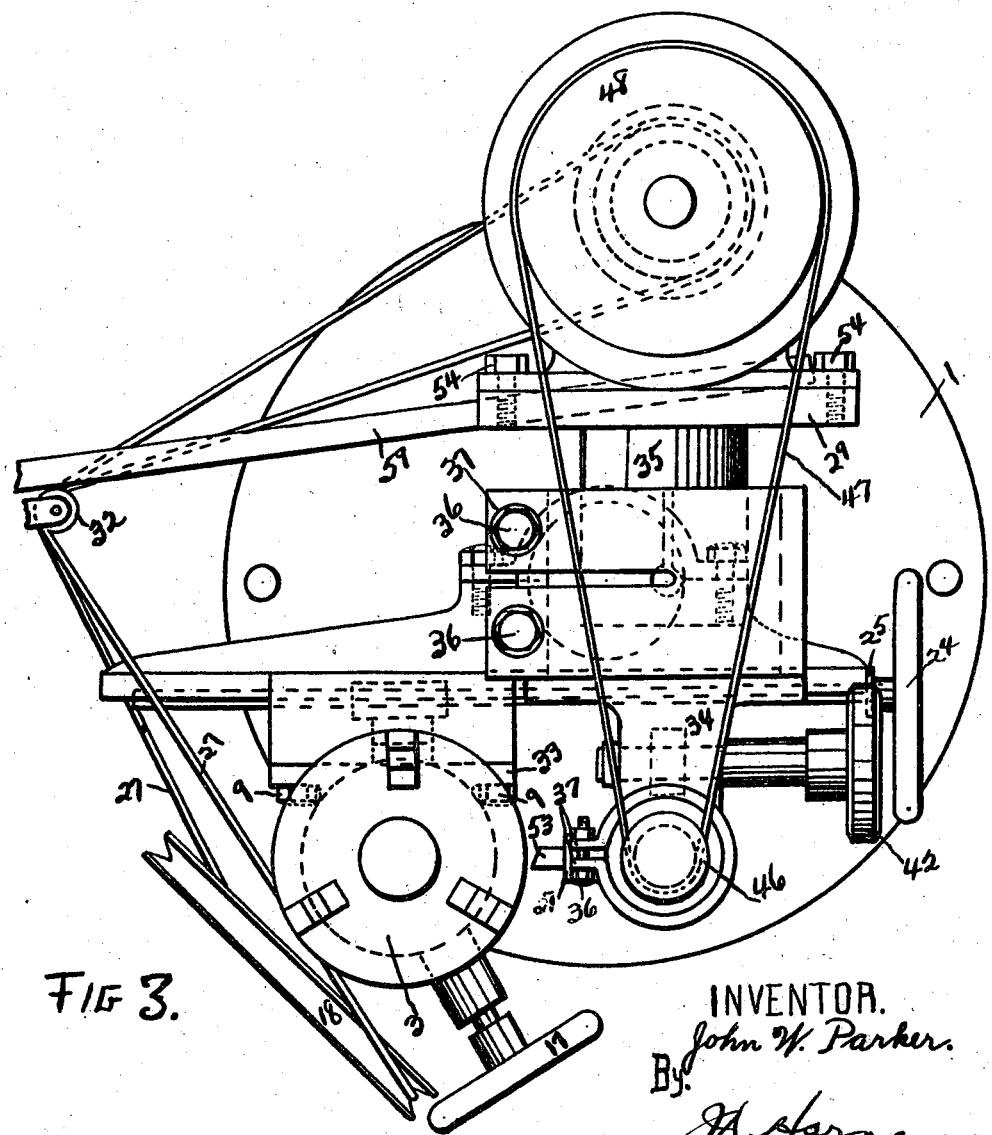

Patented Jan. 1, 1924.

1,479,205

UNITED STATES PATENT OFFICE.

JOHN W. PARKER, OF DETROIT, MICHIGAN.

UNIVERSAL GRINDING, DRILLING, AND TURNING MACHINE.

Application filed June 6, 1921. Serial No. 475,464.

*To all whom it may concern:*

Be it known that I, JOHN W. PARKER, citizen of the Kingdom of Great Britain, residing at 53 Kenilworth Avenue, in the city of Detroit, county of Wayne, State of Michigan, have invented certain new and useful Improvements in Universal Grinding, Drilling, and Turning Machines, of which the following is a specification, reference being had therein to the accompanying drawings.

My invention relates to a universal grinding, drilling and turning machine, so constructed as to be capable of adoption to the many uses required of such a machine in the ordinary garage or machine shop.

One object of my invention is to provide such a device of a cheap and durable and compact structure.

Another object of my invention is to provide a universal grinding, drilling and turning machine adopted to operate on work held at any desired angle to the machine.

Still another object of my invention is to provide such a machine of light and compact form, so that it may be moved about from place to place with comparative ease.

With these and other objects in view, my invention consists in the arrangement, combination and construction of the various parts of my improved device, as described in the specification, claimed in my claims and shown in the accompanying drawings in which:

Figure 3 is a top or plan view of my improved device.

Figure 1:
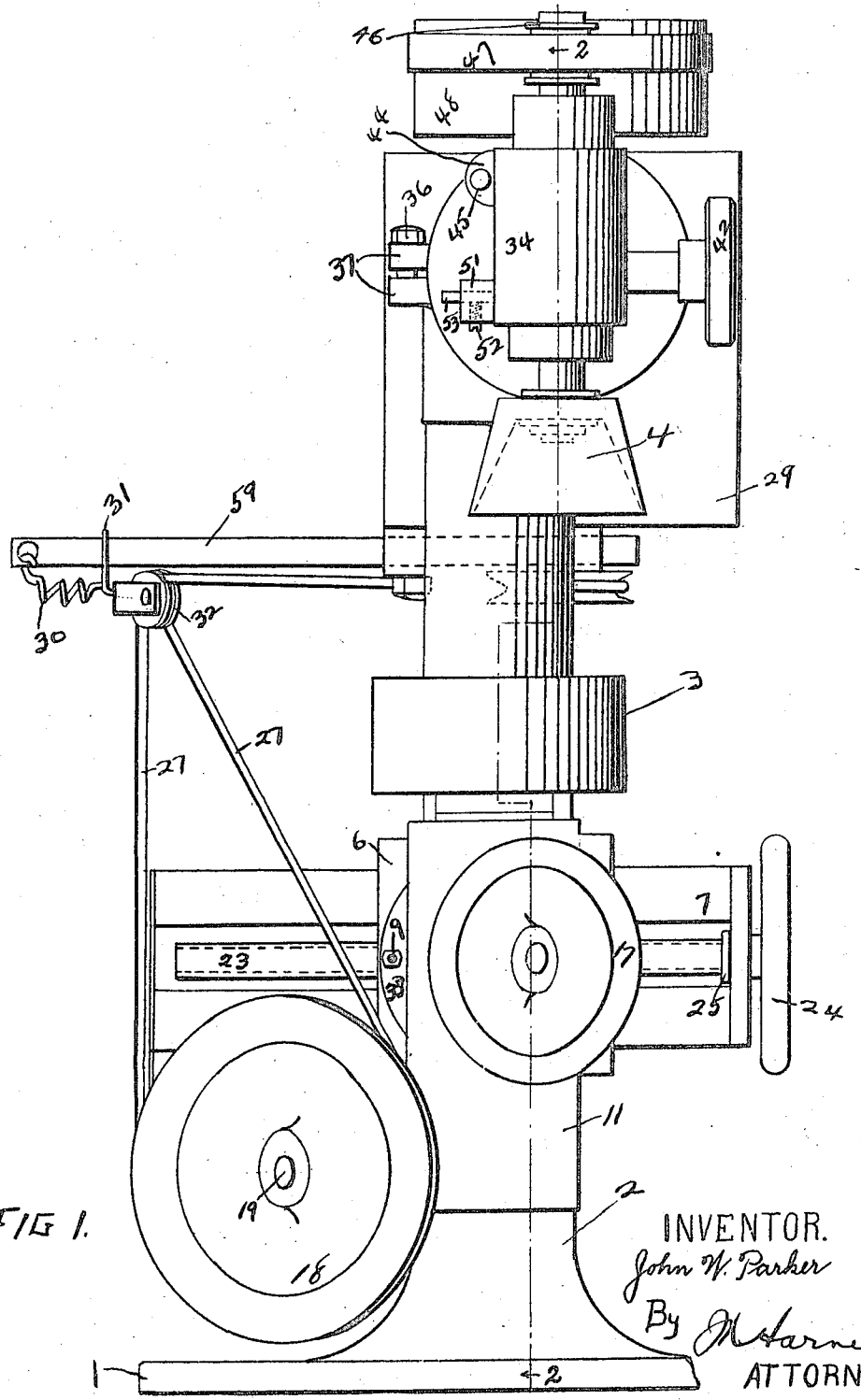
Figure 1 is an elevation of my improved device.
Figure 2:
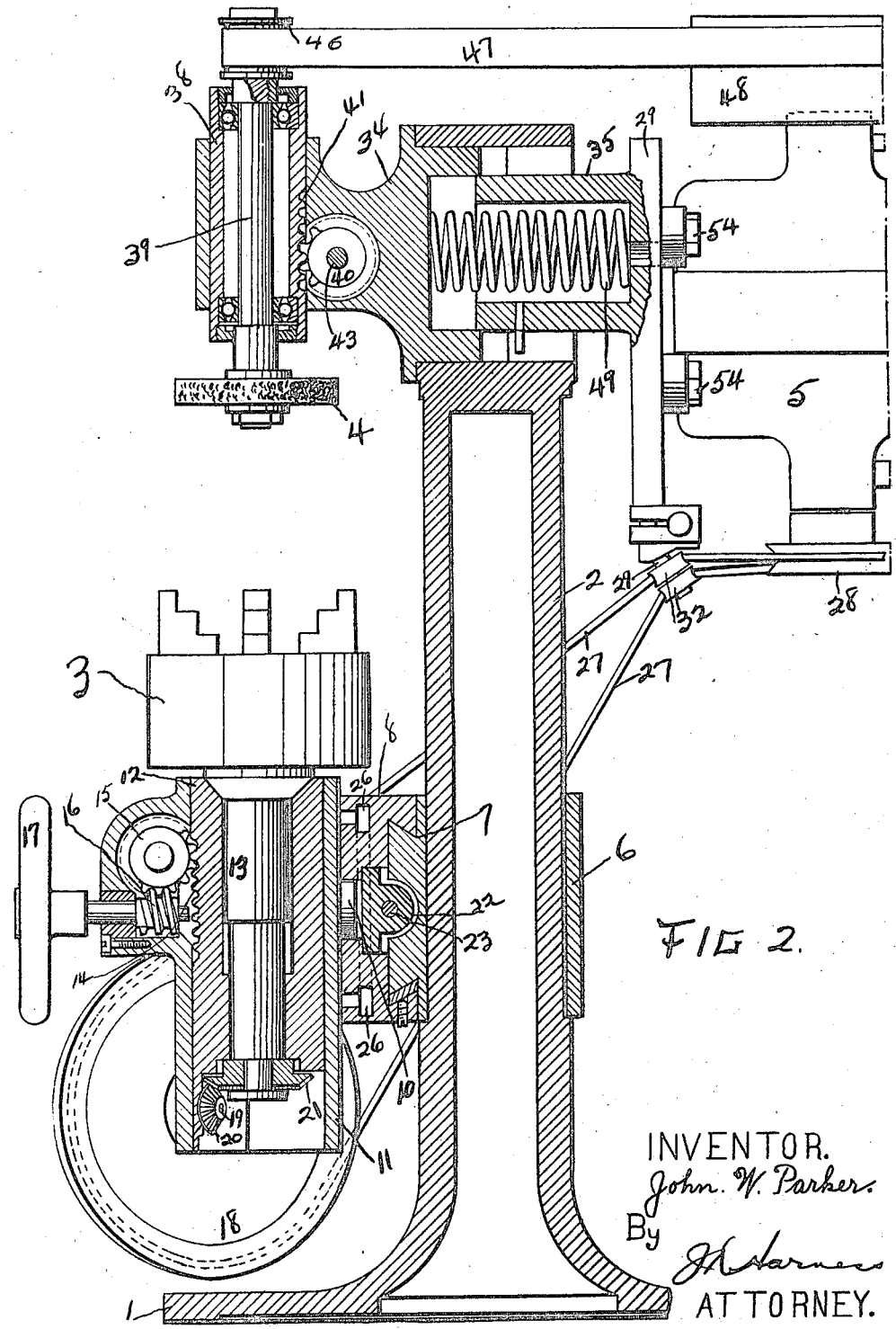
Figure 2 is a section taken on line 2—2 of Figure 1.

I provide a base 1, a main support 2, a work holding member 3, (I have shown for the purpose of illustration a three jawed chuck in Figures 2 and 3, and a magnetic chuck in Figure 1, but wish it understood that any working holding device may be used as conditions warrant), a tool 4 (which I have shown as a grinder, but which may be any desired tool) and a motor 5 for transmitting power to the operating parts.

Positioned on the main support 2 is a saddle or support 6 which is dovetailed on one side at 7 to form a cross slide for the member 8. Supported by bolts 9 and the nose 10 is the holder 11 within which is positioned the member 12 and journalled within which latter member is the spindle 13 of the work holding member 3.

In the holder 11 is the rack 14 adapted to mesh with the gear 15, which latter is operated by the worm 16 and the hand wheel 17 to allow the work holding member 3 to be moved up or down as desired.

Rigidly connected to and supported by said holder 11 is provided a driving wheel 18 with its shaft 19 extending into the holder 11 and having on its end a gear 20 adopted to mesh with the gear 21 on the end of the spindle 13 and thereby impart rotation to the work holding member 3.

In order that the holder 11 may be moved in any desired position, I fix in the member 8 a nut 22 with a screw threaded shaft 23, passing therethru and journalled in the end of the dovetailed position 7 of the saddle at 25 and a hand wheel 24 placed on the end thereof, so that by rotating the said hand wheel the member 8 and likewise work holding member 3 is moved laterally any desired distance along the dovetailed portion 7.

I also provide in the member 8 T slots 26 into which one end of the bolts 9 are positioned. These bolts extend thru the flange 33 of the holder 11 and fix the holder 11 rigidly in place when they are tightened, but when loosened, then the holder 11 may be moved sidewise in either direction with the nose 10 acting as an axis. When the holder 11 has been placed at its desired angle or in its normal vertical position, then the bolts 9 may again be tightened and the structure is held rigidly and ready for work.

The drive wheel 18 is connected to the motor 5 by means of a belt 27 running from the wheel 28 on the motor shaft.

In order that the belt tension may be correctly adjusted, I provide a rod 59, connected to the motor bracket 29 in such a manner that it may be moved longitudinally so as to add to or take from its length. On its outer end I provide a spring 30 and a ring 31 attached thereto encircling and adopted to slide upon the rod 59. Attached to the ring 31 are the belt pulleys 32, thru which the belt 27 runs. It will thus be seen that the rod 59 may be adjusted to approximately the proper length and the spring 30 will then hold the belt in its proper taut adjustment.

The main support 2 is bored at the upper end thereof as shown in Figure 2 to receive the members 34 and 35 and is also split to form a clamp for holding the same rigidly in place when the bolts 36 are screwed down thru the ears 37 on the sides of the support 2.

The member 34 receives the member 38, within which latter member is journalled the spindle 39, upon whose one end is placed the tool 4. Also positioned within the member 34 is a gear 40 which meshes with the rack 41, so that by rotating the hand wheel 42 on the end of the shaft 43, the spindle 39 and tool 4 may be raised or lowered.

The member 34 is split on one side thereof where it encircles the member 38 and ears 44 are provided on either side of said split, thru which bolts 45 pass and when screwed down, lock the member 38 in place.

A pulley 46 is positioned on the opposite end of the spindle 39 from the tool 4, upon which a belt 47 runs to the pulley 48 on the motor shaft 5.

The motor 5 is mounted on the bracket 29, which is an extension of the member 35, by means of the bolts 54.

In the assembly of the members 34 and 35, the bolts 36 are loosened, the member 34 inserted in the bored end of the support 2, then the member 35, which is bored to receive a spring 49 is inserted, together with the spring, the inner end of the member 35 entering between the split sides of the member 34. The spring 49 will adjust the two members relative to each other so that the belt 47 is at the correct tension, then the bolts 36 are again screwed down and both members are held rigidly in place. Or, on the other hand, if it is desired to set the tool 4 at an angle, the members 34 and 35 may be swung around to any degree within the bore of the support 2 and then the bolts 36 tightened so as to hold the same in any such desired angle while the work is being done.

It will thus be seen that the work holder 3 and the tool 4 may both be adjusted upwardly or downwardly, so as to lessen or add to the distance between the same, or they may be swung back and forth to any desired angles to the work or to each other. It will also be noted that the work holder may be moved in a horizontal place.

This latter movement is especially useful in the operation of my device as a cutter, wherein I have provided a boss 51 on the side of the member 34, adopted to hold in operative position by means of the set screw 52, the cutting tool 53. Thus by placing the work in the holder 3 and moving the same along in a horizontal plane on the dovetailed way 7, and imparting rotation to the spindle 13, as hereinbefore described, my device becomes a very efficient turning machine.

Some changes may be made in the arrangement and construction of the various parts of my improved device without departing from the spirit of the invention therein and it is my intention to cover by my claims such changes as may be reasonably included within the scope thereof.

I claim:

1. A device of the class described comprising a base, a vertical supporting member, a tool holding member and power transmission device for transmitting power to the said tool holding member so as to rotate the same and resilient means disposed between said tool holding member and said power transmission device for controlling the distance between said tool holding member and said power transmitting devices.

2. In a device of the class described, a combination of a base member and a vertical supporting member, said supporting member being adapted to support a work holding member and having an aperture therein adapted to receive a tool holding member and a power plant suporting member, connections between said tool holder and said power plant and means whereby both said tool holder and said power plant may be tilted in like directions and clamped in rigid position in said vertical support so as to maintain a fixed relation as to the other.

3. In a device of the class described, a base, a vertical supporting member, a tool holding member and power transmission devices for transmitting power to said tool holding device, so as to rotate the same, said vertical supporting member being apertured and split to receive and clamp said tool holding member and said power transmitting device in place, and resilient means for controlling the distance between said tool holding member and said power transmitting devices.

4. A device of the class described consisting of a work holding member and a tool holding member, means for varying the angles between said members to each other, an electric motor and belt connection to one of said members and resilient means for adjusting the tension of the said belt connection when said angles are varied.

JOHN W. PARKER.